(12) United States Patent
Wright (10) Patent No.: US 9,857,005 B2
(45) Date of Patent: Jan. 2, 2018

(54) FLUID CONNECTOR ASSEMBLY AND METHOD OF ESTABLISHING A FLUID CONNECTION

(71) Applicant: David Wright, Spring, TX (US)

(72) Inventor: David Wright, Spring, TX (US)

(73) Assignee: Wright's Well Control Services, LLC, The Woodlands, TX (US)

( * ) Notice: Subject to any disclaimer, the term of this patent is extended or adjusted under 35 U.S.C. 154(b) by 791 days.

(21) Appl. No.: 14/152,750

(22) Filed: Jan. 10, 2014

(65) Prior Publication Data

US 2015/0198271 A1   Jul. 16, 2015

(51) Int. Cl.
| | | |
|---|---|---|
| *F16L 15/00* | (2006.01) | |
| *F16L 17/02* | (2006.01) | |
| *F16L 15/08* | (2006.01) | |
| *F16L 15/04* | (2006.01) | |
| *F16L 25/08* | (2006.01) | |

(52) U.S. Cl.
CPC .............. *F16L 15/08* (2013.01); *F16L 15/04* (2013.01); *F16L 25/08* (2013.01); *F16L 15/00* (2013.01); *F16L 17/02* (2013.01)

(58) Field of Classification Search
CPC ....... F16L 15/007; F16L 15/008; F16L 15/04; F16L 25/065; F16L 15/00; F16L 15/009; F16L 15/02; F16L 15/06; F16L 21/06; F16L 25/018; F16L 25/06
USPC ......... 285/90, 91, 95, 109, 65, 66, 404, 398, 285/330, 331, 341, 369, 370, 371, 397
See application file for complete search history.

(56) References Cited

U.S. PATENT DOCUMENTS

| | | | | |
|---|---|---|---|---|
| 1,570,155 A | * | 1/1926 | Karbowski | F16L 15/08 285/328 |
| 1,769,381 A | * | 7/1930 | Montgomery | E21B 17/043 285/148.19 |
| 2,127,284 A | * | 8/1938 | Board | F16L 19/075 285/104 |
| 2,562,359 A | * | 7/1951 | Iredell, Jr. | F16D 3/76 285/231 |
| 2,783,809 A | * | 3/1957 | Haines | F16B 33/02 254/98 |

(Continued)

FOREIGN PATENT DOCUMENTS

| | | |
|---|---|---|
| EP | 82102095.5 A1 | 3/1982 |
| EP | 86110007.1 A2 | 7/1986 |

(Continued)

*Primary Examiner* — Phi A (57) ABSTRACT

Fluid connector assembly and methods usable to establish a sealed fluid connection. The connector assembly comprises a female union connector having an axial bore extending therethrough, internal threads, and an internal shoulder. The connector assembly also comprises two male connectors, each male connector having an axial bore extending therethrough and external threads. The connector assembly further comprises two ring-shaped seals adapted to form a fluid seal between the female union and the male connectors. The first seal contacts the first side of the internal shoulder and a front end of the first male connector to form a fluid seal therebetween. The second seal contacts the second side of the internal shoulder and a front end of the second male connector to form a second fluid seal therebetween.

18 Claims, 4 Drawing Sheets

(56) References Cited

U.S. PATENT DOCUMENTS

| | | | |
|---|---|---|---|
| 3,091,483 A * | 5/1963 | Hruby, Jr. | F16L 19/04 |
| | | | 285/133.4 |
| 3,151,891 A * | 10/1964 | Sanders | F16L 37/088 |
| | | | 285/110 |
| 3,215,455 A * | 11/1965 | Rudolf | F16L 37/144 |
| | | | 285/125.1 |
| 3,476,409 A | 11/1969 | Benteler et al. | |
| 4,240,652 A * | 12/1980 | Wong | E21B 17/00 |
| | | | 285/333 |
| 4,384,737 A | 5/1983 | Reusser | |
| 4,444,421 A | 4/1984 | Ahlstone | |
| 4,568,113 A | 2/1986 | Axford et al. | |
| 4,629,223 A | 12/1986 | Dearden et al. | |
| 4,630,849 A | 12/1986 | Fukui et al. | |
| 4,712,815 A | 12/1987 | Reeves | |
| 4,875,713 A | 10/1989 | Carstensen | |
| 4,907,828 A | 3/1990 | Chang | |
| 4,988,127 A | 1/1991 | Cartensen | |
| 5,015,017 A | 5/1991 | Geary | |
| 5,251,942 A | 10/1993 | Whaley | |
| 6,070,912 A | 6/2000 | Latham | |
| 6,363,598 B1 | 4/2002 | Staudt et al. | |
| 6,578,876 B2 | 6/2003 | Guertin, Jr. | |
| 6,722,426 B2 | 4/2004 | Sweeney et al. | |
| 7,677,607 B2 | 3/2010 | Densel | |

FOREIGN PATENT DOCUMENTS

| | | | |
|---|---|---|---|
| WO | 8603274 A1 | 6/1986 | |
| WO | 9735137 A1 | 9/1997 | |

\* cited by examiner

FLUID CONNECTOR ASSEMBLY AND METHOD OF ESTABLISHING A FLUID CONNECTION

FIELD

Embodiments usable within the scope of the present disclosure relate, generally, to fluid connector assemblies and methods usable to establish fluid connection between pressurized fluid lines and equipment and, more specifically, to connector assemblies comprising a female union connector and two male connectors usable for establishing a sealed fluid connection between pressurized fluid conduits or a fluid conduit and other equipment and to methods of establishing a sealed fluid connection using the connector assembly.

BACKGROUND

The development of the petrochemical industry has emphasized the need for means to transfer oil, gas, and other fluids over distances and often under rigorous conditions. The means, to transfer such fluids most often, has taken the form of marine or terrestrial conduits and pipelines. Specifically, in constructing a continuous fluid conduit, the ends of two conduits or pipes are joined axially to form a single conduit that is used to communicate a medium from one point to another, such as between two vessels, containers, other fluid conduits, or combinations thereof.

There are numerous methods currently used in the pipe and pipeline construction industry to obtain a secure joint. These methods employ different types of connectors and can be distinguished by the various ways in which such connectors are employed. The selection of these different methods will usually depend on the overall design requirements of the fluid system. Often, fluid systems comprise identical pipe segments that are welded end-to-end in an abutting relationship. Such welded pipelines, tend to be expensive to construct, and considerable testing must be undertaken to evaluate the integrity of the welded pipe joint. Moreover, this evaluation process must be continuously repeated over the life of the pipeline. In addition to being able to withstand internal pressurization, marine flow lines, for example, must be able to withstand the high external pressures associated with placement along the seabed.

In addition to welded pipelines, a variety of mechanically coupled conduits have been proposed. These mechanically joined conduits are usually constructed of flanges or clamps that result in large diameter joint segments, which cannot be used easily in J-tubes.

Flanged fittings and gaskets are typically used in rigid piping systems, such as water filtration plants, sewage disposal plants, wastewater treatment plants, pumping stations, chemical plants, and refineries. Often times, the flanged fitting is threaded directly onto the pipe. This is accomplished by threading an end of a pipe and threading a compatibly sized flanged fitting. The threaded flanged fitting is then machine-tightened onto the end of the pipe and transported to the field in this joined condition. The threaded flanged pipe is then connected to another flanged pipe, usually by bolting means. In order to obtain a leak-free joint, a gasket may be used between the faces of the two-flanged fittings.

The use of threaded flanged fittings presents several limitations. Specifically, the threaded flanged fitting is custom machined to accommodate the exact diameter of the pipe and to provide a smooth surface across the end of the pipe and the face of the flanged fitting. In addition, extremely high torque is required to tighten properly the flanged fitting onto the threaded pipe. Consequently, one major limitation of this system is that preparation of the flanged fitting and pipe requires sophisticated machinery not usually available on-site where the finished component will be assembled and installed. A further problem with flanged fittings is that the time taken to tighten a large number of flange bolts to the torque, necessary to achieve a good seal between the pipe, gasket and seal, can be considerable. It would therefore be advantageous if the use of flange bolts could be eliminated and the torque needed to achieve an efficient seal reduced without any loss of seal integrity.

Push-on joints and mechanical joints, utilizing conventional threaded connections, have an increased tendency to loosen after a lengthy period of use, especially when repeatedly placed under large bending forces, thereby rendering their use unsuitable for marine applications. Thus, a new fluid connector assembly is needed that can be used with standard pipe or pressure vessels, can be assembled easily in the field, and is equally or more stable and secure than other alternatives now available.

Joining lengths of pipe, tubing, or other fluid conduits by means of a threaded connection typically utilizes the use of a coupling (e.g., a union connector), which generally comprises a short tubular hollow piece that is about one half inch to one inch larger in outer diameter than the pipe and is threaded on its inside diameter. Generally, the coupling is threaded allowing the connection to be uncoupled by unscrewing the pipe, comprising an external thread, from one or both ends of the coupling.

It is desirable in forming a fluid connection that the connector assembly satisfies several functions. Often times, the materials being transported are liquid or gaseous in nature, and particularly in those circumstances, it is desired and needed that the fluid connector assembly provide a seal against leakage between mating threaded elements. This could be achieved by providing, upon makeup of the connector assembly, a seal between faces of male and female threaded elements. Therefore, a need exists for the mating portions of the connector assembly to maintain surface-to-surface contact to prevent leakage therebetween.

Another important design requirement and need exists when it becomes necessary to join the pipe components in a rigid or restrained manner. Specifically, it is desirable that the coupling have the capability to resist tension and thereby prevent the connection from pulling apart when the piping system is subjected to internal pressure or when earth tremors or other external forces contact the pipes. In addition, the coupling preferably should also have resistance to torsion in order to keep the pieces of pipe from rotating relative to the coupling and thereby being disconnected from the coupling. Lastly, a coupling preferably should have structural rigidity to avoid yielding under bending tension or compression stresses, or any combinations thereof.

In order to accomplish these needs, those skilled in the art are constantly in search of improved means for securing ends of fluid conduits to form a sealed fluid connection therebetween. The disadvantages of the prior art are overcome by the present invention.

SUMMARY

Embodiments usable within the scope of the present disclosure include a connector assembly usable to form a fluid connection. The connector assembly comprises a union connector having a generally cylindrical shape with a bore extending therethrough along a longitudinal axis thereof, wherein the union connector has a first end and a second end. The union connector comprises an internal annular shoulder extending laterally relative to the longitudinal axis, first internal threads between the first end of the union and the internal annular shoulder, and second internal threads between the second end of the union and the internal annular shoulder.

The connector assembly further comprises a first male connector having a generally cylindrical shape with a bore extending therethrough along a longitudinal axis thereof, wherein the first male connector comprises a first end and a second end, with external threads adjacent to the first end thereof. The connector assembly further comprises a second male connector having a generally cylindrical shape with a bore extending therethrough along a longitudinal axis thereof, wherein the second male connector comprises a first end and a second end, with external threads adjacent to the first end thereof. Engagement between the union connector and the male connectors joins the axial bore of the union connector with each of the axial bores of the male connectors to define a flowpath for communicating a medium.

The connector assembly further comprises two seals. The first seal has a generally annular shape, wherein the first seal engages the internal annular shoulder and the first male connector to form a fluid seal therebetween. The second seal has a generally annular shape, wherein the second seal engages the internal annular shoulder and the second male connector to form a fluid seal therebetween.

Another embodiment of the fluid connector assembly has a central axis extending longitudinally therethrough, wherein the fluid connector assembly comprises a female connector having a generally tubular body with a central passageway extending therethrough along the central axis. The female connector comprises a ring-shaped protrusion extending radially inward from an inside surface of the tubular body. The ring-shaped protrusion comprises a first side surface and a second side surface opposite the first side surface, a first internal thread section positioned on the first side of the ring-shaped protrusion, and a second internal thread section positioned on the second side of the ring-shaped protrusion.

The fluid connector assembly further comprises two seals. The first seal has a generally ring-shaped configuration for engaging the ring-shaped protrusion to form a fluid seal therebetween. The second seal has a generally ring-shaped configuration for engaging the ring-shaped protrusion to form a fluid seal therebetween.

The fluid connector assembly further comprises two male connectors. The first male connector has a generally tubular body with a central passageway extending therethrough and along the central axis. The first male connector comprises an external thread section for engaging the first internal thread section and a front sealing surface for engaging the first seal to form a fluid seal therebetween. The second male connector has a generally tubular body with a central passageway extending therethrough and along the central axis. The second male connector comprises an external thread section for engaging the first internal thread section and a front sealing surface for engaging the second seal to form a fluid seal therebetween.

Embodiments usable within the scope of the present disclosure include a method for making a fluid connection. The method comprising the steps of threadably engaging a first male fluid connector with a female fluid coupling, threadably engaging a second male fluid connector with the female fluid coupling, contacting a first metal seal with an internal annular shoulder of the female fluid coupling, thereby forming a fluid seal therebetween. The method further comprises the steps of contacting a second metal seal with the internal annular shoulder of the female fluid coupling, thereby forming a fluid seal therebetween, contacting the first male fluid connector with the first metal seal, thereby forming a fluid seal therebetween, and contacting the second male fluid connector with the second metal seal, thereby forming a fluid seal therebetween.

The foregoing is intended to give a general idea of the invention, and is not intended to fully define nor limit the invention. The invention will be more fully understood and better appreciated by reference to the following description and drawings.

BRIEF DESCRIPTION OF THE DRAWINGS

In the detailed description of various embodiments usable within the scope of the present disclosure, presented below, reference is made to the accompanying drawings, in which.

DETAILED DESCRIPTION OF THE EMBODIMENTS

Before describing selected embodiments of the present invention in detail, it is to be understood that the present invention is not limited to the particular embodiments described herein. The disclosure and description of the invention is illustrative and explanatory of one or more presently preferred embodiments of the invention and variations thereof, and it will be appreciated by those skilled in the art that various changes in the design, organization, order of operation, means of operation, equipment structures and location, methodology, and use of mechanical equivalents, as well as in the details of the illustrated construction or combinations of features of the various elements, may be made without departing from the spirit of the invention.

As well, the drawings are intended to describe the concepts of the invention so that the presently preferred embodiments of the invention will be plainly disclosed to one of skill in the art, but are not intended to be manufacturing level drawings or renditions of final products and may include simplified conceptual views as desired for easier and quicker understanding or explanation of the invention. As well, the relative size and arrangement of the components may differ from that shown and still operate within the spirit of the invention as described throughout the present application.

Moreover, it will be understood that various directions such as "upper", "lower", "bottom", "top", "left", "right", and so forth are made only with respect to explanation in conjunction with the drawings, and that the components may be oriented differently, for instance, during transportation and manufacturing as well as operation. Because many varying and different embodiments may be made within the scope of the inventive concept(s) herein taught, and because many modifications may be made in the embodiments described herein, it is to be understood that the details herein are to be interpreted as illustrative and non-limiting.

Figure 1:
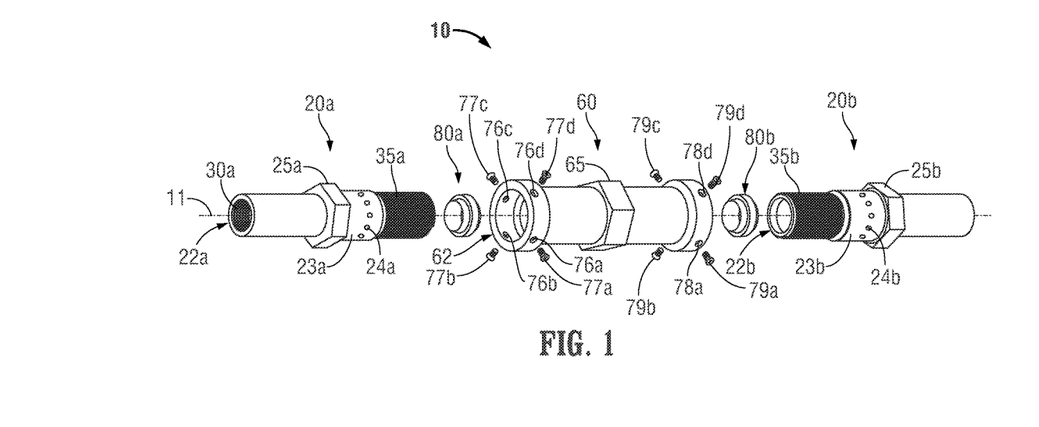
FIG. 1 depicts an isometric view of an embodiment of a fluid connector assembly usable within the scope of the present disclosure, which includes an embodiment of the fluid connector assembly in a disengaged position.
Figure 2:
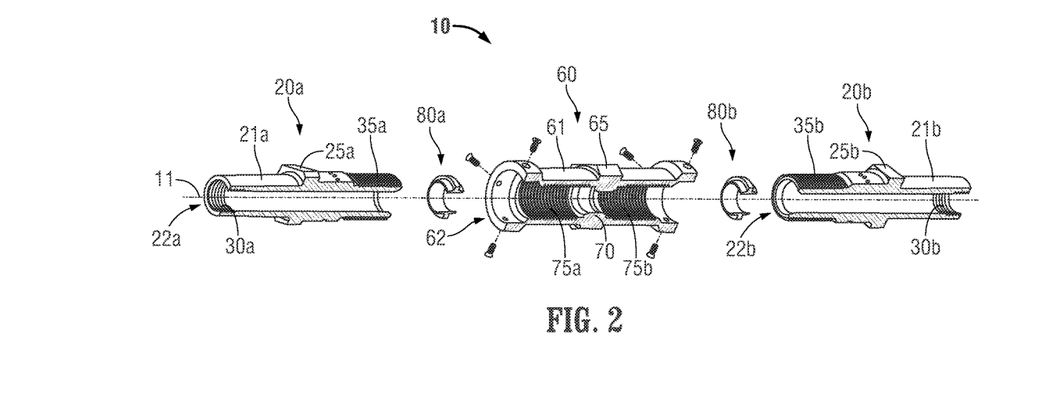
FIG. 2 depicts a cross-sectional view of an embodiment of a fluid connector assembly usable within the scope of the present disclosure, which includes an embodiment of the fluid connector assembly in a disengaged position.
Figure 3:
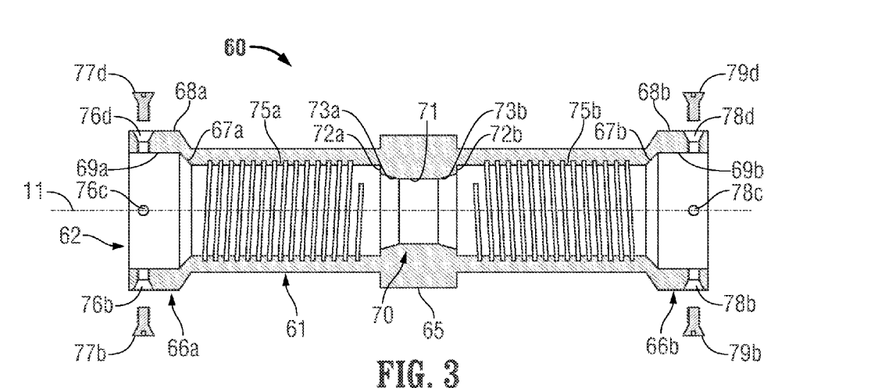
FIG. 3 depicts a cross-sectional side view of an embodiment of a union connector usable within the scope of the present disclosure.
Figure 6:
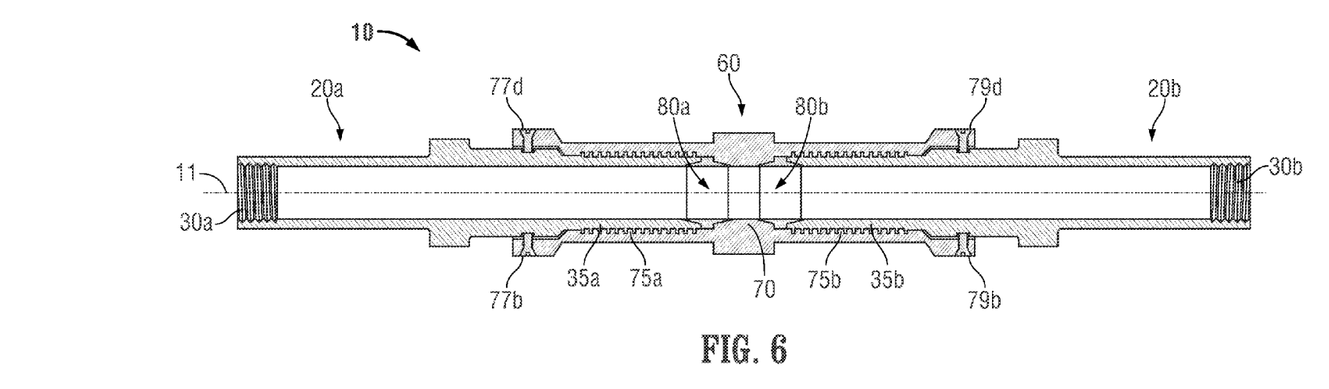
FIG. 6 depicts a cross-sectional side view of an embodiment of the fluid connector assembly usable within the scope of the present disclosure, which includes an embodiment of the fluid connector assembly in an engaged position.
Figure 7:
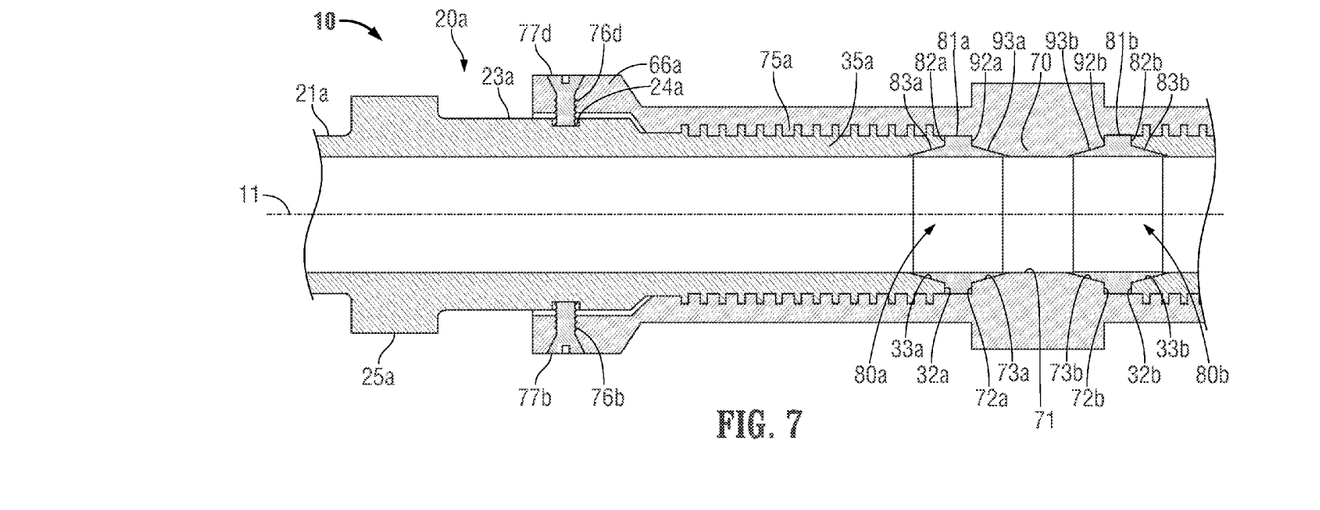
FIG. 7 depicts a cross-sectional close-up view of an embodiment of the fluid connector assembly usable within the scope of the present disclosure, which includes an embodiment of the fluid connector assembly in an engaged position.

Referring now to FIGS. 1 and 2, the Figures show exploded isometric and a cross-sectional view of an embodiment of a fluid connector assembly (10) usable within the scope of the present disclosure. Specifically, the Figures show an embodiment of the fluid connector assembly (10) in a disengaged position, comprising a union connector (60), a first male connector (20*a*), a second male connector (20*b*), and first and second ring seals (80*a*, 80*b*). FIGS. 1 and 2 also depict a generally Referring also to FIG. 3, the Figure shows a cross-sectional view of an embodiment of the union connector (60) in accordance with the present disclosure. The Figure depicts the union (60), also referred to in the industry as a coupling or a female connector, having a generally cylindrical body (61) with a bore (62) extending therethrough, along the central axis (11). The depicted union (60) further comprises external flat gripping surfaces (65) arranged in a hexagonal formation and extending from the cylindrical body (61) at approximately the center thereof, wherein the gripping surfaces (65) can enable an operator to rotate the union (60) or can prevent it from rotating about the central axis (11). As further depicted in FIG. 3, the union comprises an internal annular shoulder (70), depicted as a ring-shaped protrusion, extending within the bore (62) from the cylindrical body (61) towards the central axis (11), and extending in a generally lateral direction with respect to the central axis (11). The annular shoulder (70) is shown comprising five surfaces, wherein four of these surfaces are sealing surfaces (72*a-b*, 73*a-b*) that can be adapted to contact corresponding sealing surfaces of the ring seals (80*a*, 80*b*) to form a metal-to-metal seal therebetween, as depicted in FIGS. 6 and 7. The central surface (71) can comprise a generally smooth surface, which is depicted as the innermost surface with respect to the central axis (11), wherein the central surface (71) is depicted positioned at the center of the annular shoulder (70) and extending in a generally parallel orientation with respect the central axis (11). The diagonal sealing surfaces (73*a*, 73*b*) are depicted comprising generally smooth surfaces that are located adjacent to the central surface (71). Furthermore, the diagonal surfaces (73*a*, 73*b*) are depicted having a sloping orientation with respect of the central axis (11), having a smallest diameter adjacent to the central surface (71) and the largest diameter adjacent to the side sealing surfaces (72*a*, 72*b*). The sloping surfaces (73*a*, 73*b*) are shown comprising truncated conical shapes oriented apex to apex. FIG. 3 depicts side sealing surfaces (72*a*, 72*b*) comprising generally smooth surfaces that can extend between the diagonal surfaces (73*a*, 73*b*) and the cylindrical body (61), and can extend in a generally perpendicular (e.g., radial) direction relative to the central axis (11) of the union connector (60).

FIGS. 2 and 3 further depict the union connector (60) comprising internal threads (75*a*, 75*b*) extending about the internal surface of the cylindrical body (61) on either side of the annular shoulder (70). Although the Figures depict the threads (75*a*, 75*b*) having a square thread form, any other thread form, particularly having a generally straight (i.e. parallel) thread configuration, may be used, including trapezoidal, Acme, V-shaped, buttress thread forms, tapered thread forms or any other thread form that allow the external threads (35*a*, 35*b*) of the male connectors (20*a*, 20*b*) to fully engage the internal threads (75*a*, 75*b*) of the union connector (60).

FIGS. 2 and 3 further depict the union connector (60) comprising end funnels (66*a*, 66*b*) that can extend concentrically from the tubular body (61) at each end thereof. Each end funnel (66*a*, 66*b*) can have a generally cylindrical shape, having an outside diameter larger than the outside diameter of the cylindrical body (61) and an inside diameter larger than the inside diameter of the cylindrical body (61). The transition between the cylindrical body (61) and each end funnel (66*a*, 66*b*) comprises sloped shoulders (67*a*, 67*b*), which can contact the male connectors (20*a*, 20*b*) during engagement, as described below. Therefore, the end funnels (66*a*, 66*b*), having a larger diameter bore (62) can help capture the male connectors (20*a*, 20*b*) during engagement with the union connector (60). Furthermore, FIGS. 1 and 3 depict each end funnel (66*a*, 66*b*) comprising four threaded holes (76*a-d*, 78*a-d*) extending therethrough, along the lateral direction with respect to the central axis between the outer surfaces (68*a*, 68*b*) and the inner surfaces (69*a*, 69*b*) of each end funnel (66*a*, 66*b*). The threaded holes (76*a-d*, 78*a-d*) are adapted to receive connectors such as threaded bolts (77*a-d*, 79*a-d*), which threadably engage the holes (76*a*, 76*b*) and extend therethrough protruding past the inner surface (69*a*, 69*b*) and into the bore (22*a*).

Figure 8:
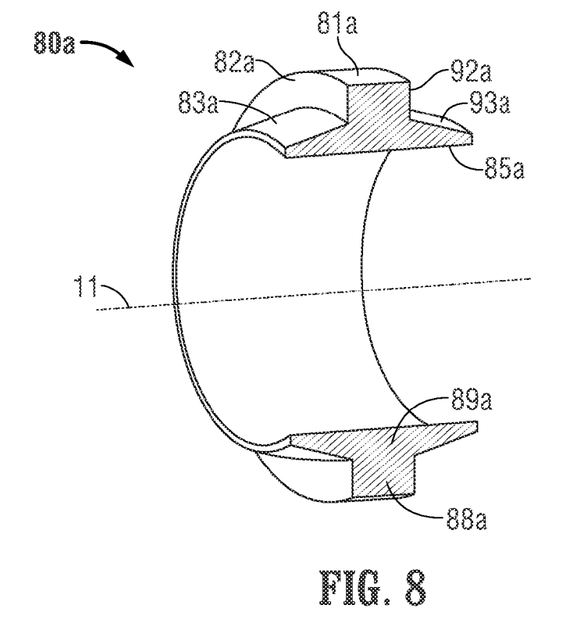
FIG. 8 depicts a cross-sectional close-up view of an embodiment of a ring seal usable within the scope of the present disclosure.

Depicted in FIGS. 1 and 2 are metallic seals referred to as ring seals (80*a*, 80*b*), which can have a generally annular or ring-shaped configuration, and which have surfaces adapted to engage the shoulder (70) and form a fluid seal therebetween. Referring now to FIG. 8, the Figure depicts a close-up cross-sectional view of an embodiment of the first ring seal (80*a*) in accordance with the present disclosure. The Figure depicts the first ring seal (80*a*) comprising an outer section (88*a*) and an inner section (89*a*) located radially inward from the outer section (88*a*), wherein the outer section (88*a*) can comprise a first side surface (82*a*) and a second side surface (92*a*) extending in a generally perpendicular (e.g., radial) direction relative to the central axis (11) of the connector assembly (10). FIG. 8 also depicts the top surface (81*a*) as the outermost surface with respect to the central axis (11), wherein the top surface (81*a*) is shown extending between the side surfaces (82*a*, 92*a*) in a generally parallel orientation with respect the central axis (11). FIG. 8 further depicts the inner section (89*a*) comprising a first diagonal surface (83*a*) and a second diagonal surface (93*a*) extending outwardly from the first and second side surfaces (82*a*, 92*a*), in a generally diagonal (e.g., sloping) direction relative to the central axis (11) of the connector assembly (10). The diagonal surfaces (83*a*, 93*a*) are shown comprising truncated conical shapes that can be oriented base to base. Lastly, the base surface (85a) can comprise a generally smooth surface, which is depicted as the innermost surface with respect to the central axis (11). The base surface (85a) is depicted extending between the outer edges of the diagonal surfaces (83a, 93a) in a generally parallel orientation with respect the central axis (11), whereby the base surface (85a) can define a generally cylindrical area.

Figure 9:
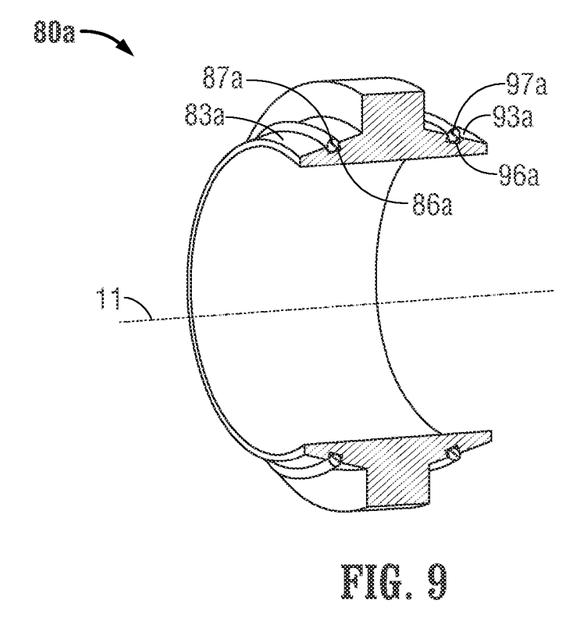
FIG. 9 depicts a cross-sectional close-up view of an embodiment of a ring seal usable within the scope of the present disclosure.

In another embodiment of the connector assembly (10), the first and/or second ring seals (80a, 80b) can comprise additional elastomeric seals to change and/or improve sealing characteristics of the connector assembly (10). Referring now to FIG. 9, the Figure depicts the first ring seal (80a) comprising O-ring seals (87a, 97a) positioned within grooves (86a, 96a) (e.g., channels) extending along the circumference of the first and the second diagonal sealing surfaces (83a, 93a). Upon full engagement between the first male connector (20a, see FIG. 4) and the union (60, see FIG. 3), the first O-ring (87a) can be compressed against the diagonal sealing surface (33a, shown in FIG. 4) of the male connector (20a), while the second O-ring (97a) can be compressed against the first diagonal sealing surface (73a, shown in FIG. 3) of the union connector (60). Material composition of the O-rings (87a, 97a) may be a nitrile butadiene rubber (NBR), polytetra-fluoro-ethylene (PTFE), or any other material having properties suitable for the specific application of the connector assembly (10). Although the embodiment of the first ring seal (80a) depicted in FIG. 9, shows the use of O-rings (87a, 97a), it should be understood that in other embodiments of the connector assembly (10), the O-rings (87a, 97a) can be replaced with any seal type adapted to create a fluid seal, including, but not limited to, U-cup seals, lip seals, and ring seals. Although only the first ring seal is described incorporating O-rings (87a, 97a), it should be understood that the second ring seal (80b), depicted in FIGS. 1 and 2, can comprise the same or similar O-rings or other additional elastomeric seals, as the first ring seal (80a).

Figure 5:
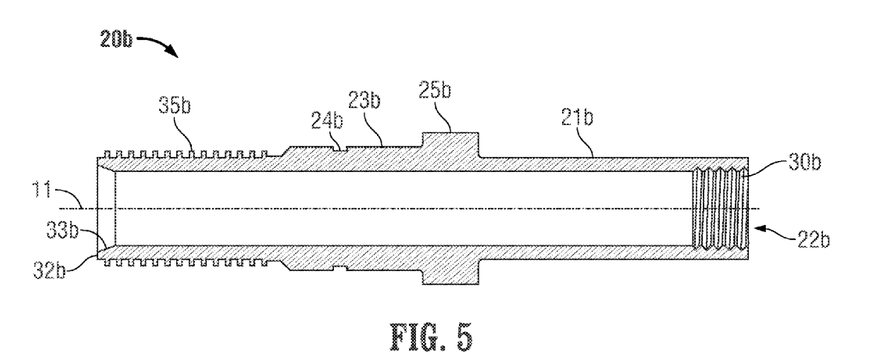
FIG. 5 depicts a cross-sectional side view of an embodiment of a second male connector usable within the scope of the present disclosure.

Although the above description and FIGS. 8 and 9 depict and describe the first ring seal (80a), it should be understood that the second ring seal (80b), shown in FIGS. 1, 2, 6, and 7 can include the same or a substantially similar configuration as the first ring seal (80a). Specifically, the second ring seal (80b) can have the same or similar components and/or parts as those of the first ring seal (80a), which was described above and depicted in FIGS. 8 and 9. The second ring seal (80b), depicted in FIGS. 1, 2, 6, and 7 has been labeled with like reference numerals to the first ring seal (80a) to represent the same components and/or parts, but ending with the letter "b." These include components and/or parts of the second male connector (20b), such as a generally cylindrical body (21b), a bore (22b), a thicker portion (23b), circular cavities (24b), gripping surfaces (25b), and female threads (30b). Furthermore, the second ring seal (80b) can also function in the same or a similar fashion as the first ring seal (80a). Specifically, the second ring seal (80b) can be placed within the bore (62) of the union connector (60) for forming a fluid seal with the second side and diagonal sealing surfaces (72b, 73b shown in FIG. 3) of the annular shoulder (70) and for forming a fluid seal with the front and diagonal surfaces (32b, 33b shown in FIG. 5) of the second male connector in the same or a similar manner as the first ring seal (80a) described above.

Figure 4:
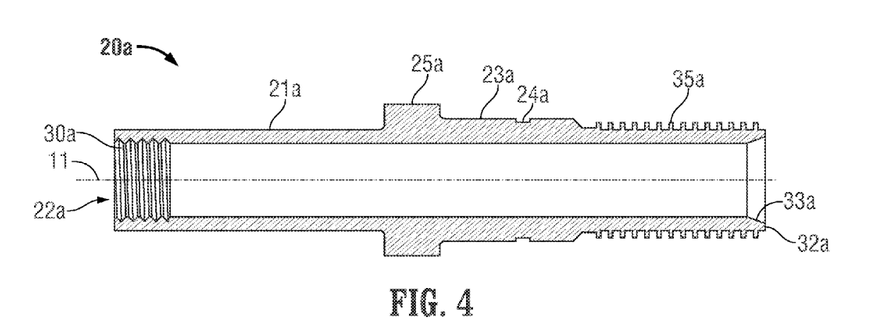
FIG. 4 depicts a cross-sectional side view of an embodiment of a first male connector usable within the scope of the present disclosure.

Referring now to FIG. 4, showing a cross-sectional view of an embodiment of the first male connector (20a) in accordance with the present disclosure. The Figure depicts the male connector (20a) having a generally cylindrical body (21a) with a bore (22a) extending longitudinally therethrough, along the central axis (11). The depicted male connector (20a) further comprises external threads (35a) extending along the body (21a), adjacent to the first end of the male connector (20a) and a connection section, depicted as female threads (30a), formed within the body (21a) and adjacent to the second end of the male connector (20a). The depicted male connector (20a) further comprises external flat gripping surfaces (25a) arranged in a hexagonal formation extending from the cylindrical body (21a) at approximately the center of the male connector (20a), wherein the gripping surfaces (25a) can enable an operator to rotate the male connector (20a) or can prevent the male connector (20a) from rotating about the central axis (11). FIG. 4 depicts the male connector (20a) having external threads (35a) that are adapted for engagement with the first internal threads (75a shown in FIG. 3) of the union connector (60) in FIG. 4. Although the depicted threads (35a) comprise a square thread form, any thread form having a generally straight (i.e. parallel) thread configuration, may be used, including trapezoidal, Acme, V-shaped, buttress thread forms, tapered threads, or any other thread form, which allows the external threads (35a) to fully engage the internal threads (75a) of the union connector (60).

As further depicted in FIG. 4, the male connector (20a) comprises a thicker portion (23a) of the cylindrical body (21a) having a larger outside diameter located between the external threads (35a) and the gripping surfaces (25a). The thicker portion (23a) is adapted for insertion into the bore (22a), defined by the first end funnel (66a), depicted in FIG. 3, wherein the thicker portion (23a) has an outside diameter that is adapted for insertion within the inside surface (69a) of the end funnel (66a). FIGS. 1 and 4 further depict the male connector (20a) having a plurality of circular cavities (24a) extending into the thicker portion (23a) of the cylindrical body (21a), wherein the circular cavities (24a) can be positioned circumferentially about the thicker portion (23a). The circular cavities (24a) can be adapted to receive the threaded bolts (77a-d), an unthreaded pin, or other connector or elongated member (not shown), which can protrude past the inside surface (69a) of the end funnel (66a) during connector (10) locking procedures, following full engagement between the male (20a) and the union (60) connectors, as depicted in FIGS. 6 and 7 and further explained below. It should be understood that any number of circular cavities (24a) can be incorporated into the male connector (20a), wherein the circular cavities (24a) are adapted to receive any combination of threaded bolts (77a-d) or pins at the same time.

In an alternate embodiment (not shown) of the connector assembly (10), the male connector (20a) can have a rectangular groove (e.g., a channel), instead of the plurality of circular cavities (24a), extending circumferentially about the thicker portion (23a) of the cylindrical body (21a). The groove can be adapted to receive the threaded bolts (77a-d) or unthreaded pin (not shown) which protrude past the inside surface (69a) of the end funnel (66a) during connector (10) locking procedures, thereby locking the male connector (20a) against the union connector (60) and preventing relative rotation therebetween.

The second end of the first male connector (20a), as depicted in FIG. 4, comprises an end connection adapted to make a fluid connection with a fluid conduit, a manifold, a wellhead, a BOP, or another piece of subsea equipment (not shown). As depicted, the end connection comprises a female thread (30a), which can be adapted to receive a male thread of a fluid supply line (not shown). Alternate embodiments (not shown) of the end connection may include any connection type know in the industry for providing a sealed fluid connection. For example, the end connection may comprise a male thread, a flange connection, a flared end, or any other fluid connector configured for attachment to a hydraulic line, a pneumatic line, a pipe, a tubular, or any other fluid conduit or piece of subsea equipment. As depicted in FIG. 4, the end connection can be integrally formed with the cylindrical body (21a), or manufactured separately and secured to the body (21a) by any available means, such as welding or a threaded connection.

FIG. 4 further depicts the first male connector (20a) comprising a front sealing surface (32a) and a diagonal (e.g., sloping) sealing surface (33a) located at the front end of the first male connector (20a). Specifically, the front sealing surface (32a) is depicted as a generally smooth ring-shaped surface extending in a generally perpendicular (e.g., radial) direction relative to the central axis (11) of the first male connector (20a), wherein the front sealing surface (32a) can be adapted to engage the first side surface (82a) of the first ring seal (60), depicted in FIG. 8. The diagonal sealing surface (33a) of the male connector (20a) is depicted as a generally smooth surface adjacent to the front sealing surface (32a) extending inwardly from the front sealing surface (32a) in a generally diagonal (e.g., sloping) direction relative to the central axis (11) of the male connector (20a), wherein the diagonal sealing surface (33a) is adapted to engage the diagonal sealing surface (83a) of the first ring seal (60). The diagonal sealing surface (33a) is shown comprising a truncated conical shape with its base adjacent to the front sealing surface (32a).

Referring again to FIGS. 6 and 7, the Figures show the first male connector (20a) and the first ring seal (80a) fully engaged with the union connector (60). The Figures depict a connector assembly (10) comprising a central fluid passageway, having a generally uniform inside diameter, extending therethrough, formed by the male connectors (20a, 20b), the ring seals (80a, 80b), and the union connector (60).

The Figures further depict the front and the diagonal sealing surfaces (32a, 33a) of the first male connector (20a) engaged with the first side and the first diagonal sealing surfaces (82a, 83a) of the first ring seal (80a), forming a metal-to-metal fluid seal therebetween. It should be understood that while FIGS. 6 and 7 depict the front and the diagonal sealing surfaces (32a, 33a) of the first male connector (20a) being positioned flush against the first side and the first diagonal sealing surfaces (82a, 83a) of the first ring seal (80a), in alternate embodiments of the male connector (20a), the sealing surfaces (32a, 33a) may extend at an angle with respect to the corresponding sealing surfaces (82a, 83a) of the first ring seal (80a). In another embodiment of the connector assembly (10), the sealing surfaces (32a, 33a) of the male connector (20a) can comprise an outwardly curving (i.e. convex) shape, resulting in a smaller area of contact with the corresponding sealing surfaces (82a, 83a) of the first ring seal (80a), which can increase contact pressure therebetween.

FIGS. 6 and 7 also depict the first side and the first diagonal sealing surfaces (72a, 73a) of the annular shoulder (70) engaged with the second side and the second diagonal sealing surfaces (92a, 93a) of the first ring seal (80a), forming a metal-to-metal fluid seal therebetween. It should be understood that while FIGS. 6 and 7 depict the first side and the first diagonal sealing surfaces (72a, 73a) of the annular shoulder (70) being positioned flush against the second side and the second diagonal sealing surfaces (92a, 93a) of the first ring seal (80a), in alternate embodiments of the male connector (20a), the sealing surfaces (72a, 73a) may extend at an angle with respect to the corresponding sealing surfaces (92a, 93a) of the first ring seal (80a). In another embodiment of the connector assembly (10), the sealing surfaces (72a, 73a) of the annular shoulder (70) can comprise an outwardly curving (i.e. convex) shape, resulting in a smaller area of contact with the corresponding sealing surfaces (92a, 93a) of the first ring seal (80a), which can increase contact pressure therebetween.

FIGS. 6 and 7 further depict the bolts (77a-d, 77a and 77c not shown) fully engaged within the threaded holes (76a-d, 76a and 77c not shown) and extending into corresponding circular cavities (24a) to make contact with the bottom of the cavity (24a). Once contact with the bottom or the walls of the cavity (24a) is made, or when the bolts (77a-d) are fully threadably engaged (e.g., bottomed out) within the threaded holes (76a-d), the male connector (20a) is locked with the union connector (60), thereby preventing relative rotation therebetween.

Although the above description discusses the first male connector (20a), it should be understood that the second male connector (20b), shown in FIGS. 1, 2, 5, and 6 can include the same or a substantially similar configuration as the first male connector (20a). Specifically, the second male connector (20b) can have the same or similar parts as those of the first male connector (20a), which was described above and depicted in FIGS. 1, 2, 4, 6, and 7. The second male connector (20b), depicted in FIGS. 1, 2, 5, and 6, has been labeled with like reference numerals to the first male connector (20a) to represent the same parts, but ending with the letter "b." These include components and/or parts of the second male connector (20b), such as a front sealing surface (32b) and a diagonal sealing surface (33b). These include components and/or parts of the second seal (80b), such as a top surface (81b), side surfaces (82b, 92b), and diagonal surfaces (83b, 93b). Furthermore, the second male connector (20b) can function in the same or a similar fashion as the first male connector (20a). Specifically, as depicted in FIGS. 6 and 7, the second male connector (20b) can threadably engage the second internal threads (75b) of the union connector (60) and form a fluid seal with the first side and diagonal surfaces (82b, 83b) of the second ring seal (80b) in the same or a similar manner as the first male connector (20a) engages the union connector (60) and the first ring seal (80a) described above.

Lastly, the male connectors (20a, 20b) and the union connector (60) depicted in FIGS. 1 and 2 can be constructed from any material having adequate strength to withstand repetitive and/or long periods of high internal pressures and having resistance to harsh environmental conditions, such as chemical corrosion and/or sea water.

Embodiments usable within the scope of the present disclosure also relate to methods of establishing a fluid connection. Prior to engaging the male connectors (20a, 20b) with the union (60), as shown in FIGS. 1 and 2, the connection sections, depicted as female threads (30a, 30b), can be connected with a fluid conduit, a manifold, a wellhead, a BOP, or another piece of subsea equipment (not shown).

Thereafter, the first and second ring seals (80a, 80b) can be inserted into the bore (62) of the union (60), as shown in FIGS. 6 and 7, whereby the second side sealing surface (92a) and the second diagonal sealing surfaces (93a) of the first ring seal (80a) are positioned against the first side sealing surface (72a) and the first diagonal sealing surfaces (73a) of the internal annular shoulder (70). Similarly, the first side and the diagonal sealing surfaces (92b, 93b) of the second ring seal (80b) are positioned against the second side and diagonal sealing surfaces (72b, 73b) of the internal annular shoulder (70).

Once the ring seals (80a, 80b) are inserted into the union (60), the male connectors (20a, 20b) can be positioned in linear alignment with the bore (62) on each side of the union (60), along the central axis (11), and inserted therein until the external threads (35a, 35b) make contact with the internal threads (75a, 75b), respectively. At this point, the first and/or second male connectors (20a, 20b) can be rotated in the same direction in relation to the union (60) until the threads engage. Alternatively, the union connector (60) can be rotated about the central axis (11) as the first and/or second male connectors (20a, 20b) remain rotationally static, but are brought closer together as they threadably engage the union (60). As the first male connector (20a) approaches full engagement with the union (60), the front and diagonal sealing surfaces (32a, 33a) can make contact with the corresponding first side and diagonal sealing surfaces (82a, 83a) of the first ring seal (80a), thereby creating a metal-to-metal fluid seal therebetween. Simultaneously, as the first male connector (20a) contacts the first ring seal (80a), the second side and diagonal sealing surfaces (92a, 93a) of the first ring seal (80a) can make contact with the corresponding first side and diagonal sealing surfaces (72a, 73a) of the internal annular shoulder (70) forming a metal-to-metal fluid seal therebetween. Consequently, the first ring seal (80a) provides a fluid seal between the first male connector (20a) and the union connector (60), depicted in FIGS. 6 and 7. Furthermore, the first male connector (20a) can be tightened within the union (60), thereby creating additional force of contact between the sealing surfaces (32a, 33a) of the first male connector (20a), the sealing surfaces (82a, 83a, 92a, 93a) of the first ring seal (80a), and the first sealing surfaces (72a, 73a) of the annular shoulder (70), thereby improving the sealing capabilities of the metal-to-metal seal. Simultaneously or thereafter, the second male connector (20b) can be threadably engaged with the union connector (60) using the same or substantially similar method as described above to form a fluid seal therebetween.

While various embodiments of the present invention have been described with emphasis, it should be understood that within the scope of the appended claims, the present invention might be practiced other than as specifically described herein.

What is claimed is:

1. A connector assembly usable to form a fluid connection comprising:
    a union connector having a generally cylindrical shape with a bore extending therethrough along a longitudinal axis thereof, wherein the union connector has a first end and a second end, wherein the union connector comprises:
        an internal annular shoulder extending laterally relative to the longitudinal axis, comprising a first side sealing surface and a second side sealing surface extending perpendicularly relative to the longitudinal axis, and a first diagonal sealing surface and a second diagonal sealing surface extending diagonally relative to the longitudinal axis;
        first internal threads between the first end of the union connector and the internal annular shoulder; and
        second internal threads between the second end of the union connector and the internal annular shoulder;
    a first male connector having a generally cylindrical shape with a bore extending therethrough along a longitudinal axis thereof, wherein the first male connector comprises a first end and a second end, wherein the first male connector comprises external threads adjacent to the first end thereof;
    a second male connector having a generally cylindrical shape with a bore extending therethrough along a longitudinal axis thereof, wherein the second male connector comprises a first end and a second end, wherein the second male connector comprises external threads adjacent to the first end thereof;
    a first seal having a generally annular shape, wherein the first seal engages the internal annular shoulder and the first male connector to form a fluid seal therebetween; and
    a second seal having a generally annular shape, wherein the second seal engages the internal annular shoulder and the second male connector to form a fluid seal therebetween,
    wherein engagement between the union connector and the male connectors joins the axial bore of the union connector with each of the axial bores of the male connectors to define a flowpath for communicating a medium.

2. The connector assembly of claim 1, wherein the first diagonal sealing surface and the second diagonal sealing surface are located radially inward from the first side sealing surface and the second side sealing surface.

3. The connector assembly of claim 2, wherein the first diagonal sealing surface and the second diagonal sealing surface of the internal annular shoulder comprise a truncated conical shape oriented apex to apex.

4. The connector assembly of claim 1, wherein the first seal and the second seal each have an outer section and an inner section that is located radially inward from the outer section, wherein the outer section comprises a first side surface and a second side surface, and wherein the inner section comprises a first diagonal surface extending outwardly from the first side surface and a second diagonal surface extending outwardly from the second side surface.

5. The connector assembly of claim 4, wherein the first male connector comprises a front sealing surface that contacts the first seal to form a fluid seal therebetween, and wherein the second male connector comprises a front sealing surface that contact the second seal to form a fluid seal therebetween.

6. The connector assembly of claim 5, wherein the first male connector further comprises a diagonal sealing surface that contacts the first seal to form a fluid seal therebetween, and wherein the second male connector further comprises a diagonal sealing surface that contacts the second seal to form a fluid seal therebetween.

7. The connector assembly of claim 1, wherein the union connector has at least one threaded hole extending laterally therethrough adjacent to the first end thereof, wherein the union connector has at least one threaded hole extending laterally therethrough adjacent to the second end thereof, and wherein the threaded holes receive a bolt, a pin, or an elongated member.

8. The connector assembly of claim 7, wherein the first male connector comprises a plurality of cavities positioned along an outer surface of the first male connector, wherein the second male connector comprises a plurality of cavities positioned along an outer surface of the second male connector, and wherein the cavities of the first male connector and the second male connector are adapted for receiving the bolt, the pin, or the elongated member for locking the male connectors within the union connector.

9. The connector assembly of claim 6, wherein the front sealing surfaces of the first male connector and the second male connector form a metal-to-metal fluid seal with the first and second side surfaces of the first seal and the second seal, and wherein the diagonal sealing surfaces of the first male connector and the second male connector form a metal-to-metal fluid seal with the first and second diagonal surfaces of the first seal and the second seal.

10. The connector assembly of claim 1, wherein the second end of each male connector is adapted for connection to a container, a pipe, a fluid conduit, or combinations thereof.

11. A fluid connector assembly having a central axis extending longitudinally therethrough, the fluid connector assembly comprising:
    a female connector having a generally tubular body with a central passageway extending therethrough along the central axis, wherein the female connector comprises:
        a ring-shaped protrusion extending radially inward from an inside surface of the tubular body, wherein the ring-shaped protrusion comprises a first side surface extending perpendicularly with respect to the central axis, a second side surface opposite the first side surface extending perpendicularly with respect to the central axis, a first sloping surface extending diagonally with respect to the central axis from the first side surface, and a second sloping surface extending diagonally with respect to the central axis from the second side surface;
        a first internal thread section positioned on the first side of the ring-shaped protrusion; and
        a second internal thread section positioned on the second side of the ring-shaped protrusion;
    a first seal having a generally ring-shaped configuration for engaging the ring-shaped protrusion to form a fluid seal therebetween;
    a second seal having a generally ring-shaped configuration for engaging the ring-shaped protrusion to form a fluid seal therebetween;
    a first male connector having a generally tubular body with a central passageway extending therethrough and along the central axis, wherein the first male connector comprises:
        an external thread section for engaging the first internal thread section; and
        a front sealing surface for engaging the first seal to form a fluid seal therebetween; and
    a second male connector having a generally tubular body with a central passageway extending therethrough and along the central axis, wherein the second male connector comprises:
        an external thread section for engaging the first internal thread section; and
        a front sealing surface for engaging the second seal to form a fluid seal therebetween.

12. The fluid connector of claim 11, wherein each of the first and the second seals comprise a first sloping surface and a second sloping surface extending diagonally with respect to the central axis, wherein the first sloping surface and the second sloping surface of the first and the second seals converge along a radially outward direction, wherein each of the first and the second seals comprise a first side surface and a second side surface extending radially outward from the first sloping surface and the second sloping surface respectively, wherein the second sloping surface of the first seal is engagable with the first sloping surface of the ring-shaped protrusion, and wherein the second sloping surface of the second seal is engagable with the second sloping surface of the ring-shaped protrusion.

13. The fluid connector of claim 12, wherein the first male connector and the second male connector further comprise a sloping sealing surface extending diagonally with respect to the central axis, and wherein the sloping sealing surfaces of the first and the second male connectors are adapted to engage the first sloping surfaces of the first and the second seals.

14. The connector assembly of claim 11, wherein the female connector has at least one threaded hole extending laterally therethrough on each side of the female connector, wherein the at least one threaded hole is adapted to receive a bolt, a pin, or an elongated member, and wherein the bolt, the pin, and the elongated member is adapted to contact the first or the second male connectors to prevent relative movement therebetween.

15. A method for making a fluid connection, the method comprising the steps of:
    threadably engaging a first male fluid connector with a female fluid coupling having a bore extending therethrough along a longitudinal axis of the female fluid coupling;
    threadably engaging a second male fluid connector with the female fluid coupling;
    contacting a first metal seal with an internal annular shoulder of the female fluid coupling, thereby forming a fluid seal therebetween;
    contacting a second metal seal with the internal annular shoulder of the female fluid coupling, thereby forming a fluid seal therebetween;
    contacting a front surface of the first male fluid connector with a first side surface of the first metal seal, the first side surface of the first metal seal extending perpendicularly relative to the longitudinal axis, and contacting a diagonal surface of the first male fluid connector with a first diagonal surface of the first metal seal, thereby forming a fluid seal therebetween; and
    contacting a front surface of the second male fluid connector with a first side surface of the second metal seal, the first side surface of the second metal seal extending perpendicularly relative to the longitudinal axis, and contacting a first diagonal surface of the second male fluid connector with a diagonal surface of the second metal seal, thereby forming a fluid seal therebetween.

16. The method of claim 15, wherein the step of contacting the first metal seal with the internal annular shoulder of the female fluid coupling comprises contacting a second side surface of the first metal seal with a first side surface of the internal annular shoulder of the female fluid coupling, thereby forming a fluid seal therebetween, and contacting a second diagonal surface of the first metal seal with a first diagonal surface of the internal annular shoulder of the female fluid coupling, thereby forming a fluid seal therebetween, and wherein the step of contacting the second metal seal with the internal annular shoulder of the female fluid coupling comprises contacting a second side surface of the second metal seal with a second side surface of the internal annular shoulder of the female fluid coupling, thereby forming a fluid seal therebetween, and contacting a second diagonal surface of the second metal seal with a second diagonal surface of the internal annular shoulder of the female fluid coupling, thereby forming a fluid seal therebetween.

17. The method of claim 15, further comprising the step of extending bolts, pins, or elongated members through a wall of the female fluid coupling, contacting the threaded bolts with the first and the second male connectors.

18. The method of claim 17, wherein the step of contacting the bolts, the pins, or elongated members with the first male connector and the second male connector comprises:
   moving the bolts, the pins, or the elongated members into a cavity extending into a surface of the first and the second male connectors; and
   contacting the bolts, the pins, or the elongated members with a bottom or a wall of the cavity, thereby locking the first and the second male connectors within the female fluid coupling.

* * * * *